US007575517B2

(12) United States Patent
Parham et al.

(10) Patent No.: US 7,575,517 B2
(45) Date of Patent: Aug. 18, 2009

(54) TECHNIQUES FOR GENERATING RANDOM AWARDS USING A PLURALITY OF AVERAGE VALUES

(75) Inventors: Tyler Thomas Parham, Reno, NV (US); William K. Bertram, Reno, NV (US)

(73) Assignee: Gaming Enhancements, Inc., Reno, NV (US)

( * ) Notice: Subject to any disclaimer, the term of this patent is extended or adjusted under 35 U.S.C. 154(b) by 81 days.

(21) Appl. No.: 11/303,878

(22) Filed: Dec. 15, 2005

(65) Prior Publication Data

US 2006/0160612 A1 Jul. 20, 2006

Related U.S. Application Data

(60) Provisional application No. 60/636,061, filed on Dec. 15, 2004, provisional application No. 60/678,132, filed on May 6, 2005.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................ 463/26; 463/25; 463/27; 463/28; 463/29; 273/143 R; 273/138.2; 273/202

(58) Field of Classification Search ................. 463/216, 463/21–22, 25–28
See application file for complete search history.

(56) References Cited

U.S. PATENT DOCUMENTS 4,448,419 A 5/1984 Telnaes
4,582,324 A 4/1986 Koza et al.
4,837,728 A 6/1989 Barrie et al.
4,861,041 A 8/1989 Jones et al.
5,078,405 A 1/1992 Jones et al.
5,116,055 A 5/1992 Tracy
5,280,909 A 1/1994 Tracy
5,324,035 A 6/1994 Morris et al.
5,332,219 A 7/1994 Marnell et al.
5,344,144 A 9/1994 Canon
5,364,104 A 11/1994 Jones et al.
5,401,023 A 3/1995 Wood
5,417,430 A 5/1995 Breeding
5,544,893 A 8/1996 Jones et al.
5,584,485 A 12/1996 Jones et al.
5,626,341 A 5/1997 Jones et al.
5,655,961 A 8/1997 Acres et al.
5,702,304 A 12/1997 Acres et al.
5,707,285 A 1/1998 Place et al.
5,741,183 A 4/1998 Acres et al.
5,743,800 A 4/1998 Huard et al.
5,752,882 A 5/1998 Acres et al.

(Continued)

*Primary Examiner*—John M. Hotaling, II
*Assistant Examiner*—P. A. D'Agostino
(74) *Attorney, Agent, or Firm*—Brian N. Young; Trellis IP Law Group, PC

(57) ABSTRACT

A method of providing a game for a gaming device is provided. The method includes providing a plurality of average values. Average values in the plurality of average values represent different values of a prize pool. A wager amount and an input to initiate game play are received. An average value is selected from the plurality of average values and a random award is determined from the prize pool. The random award is determined from the average value selected from the plurality of average values.

28 Claims, 5 Drawing Sheets

200

202 204

| Average Value | Weight |
|---|---|
| 10% | 75 |
| 25% | 10 |
| 50% | 8 |
| 75% | 7 |
| 100% | 100 |

400

U.S. PATENT DOCUMENTS

| | | | | | |
|---|---|---|---|---|---|
| 5,794,964 | A | | 8/1998 | Jones et al. | |
| 5,795,225 | A | | 8/1998 | Jones | |
| 5,820,459 | A | | 10/1998 | Acres et al. | |
| 5,836,817 | A | | 11/1998 | Acres et al. | |
| 5,876,284 | A | | 3/1999 | Acres et al. | |
| 5,885,158 | A | | 3/1999 | Torango et al. | |
| 5,913,726 | A | | 6/1999 | Jones et al. | |
| 5,941,773 | A | | 8/1999 | Harlick | |
| 6,032,955 | A | | 3/2000 | Luciano et al. | |
| 6,045,130 | A | | 4/2000 | Jones et al. | |
| 6,062,981 | A | * | 5/2000 | Luciano, Jr. | 463/26 |
| 6,070,878 | A | | 6/2000 | Jones et al. | |
| 6,073,930 | A | | 6/2000 | Jones et al. | |
| 6,089,976 | A | | 7/2000 | Schneider et al. | |
| 6,110,043 | A | | 8/2000 | Olsen | |
| 6,139,430 | A | | 10/2000 | Huard et al. | |
| 6,146,270 | A | | 11/2000 | Huard et al. | |
| 6,146,273 | A | | 11/2000 | Olsen | |
| 6,162,122 | A | | 12/2000 | Acres et al. | |
| 6,210,276 | B1 | | 4/2001 | Mullins | |
| 6,217,448 | B1 | | 4/2001 | Olsen | |
| 6,224,482 | B1 | | 5/2001 | Bennett | |
| 6,231,445 | B1 | | 5/2001 | Acres | |
| 6,319,125 | B1 | | 11/2001 | Acres | |
| 6,336,859 | B2 | | 1/2002 | Jones et al. | |
| 6,358,149 | B1 | | 3/2002 | Schneider et al. | |
| 6,375,567 | B1 | | 4/2002 | Acres | |
| 6,413,161 | B1 | | 7/2002 | Baerlocher et al. | |
| 6,435,511 | B1 | | 8/2002 | Vancura et al. | |
| 6,443,452 | B1 | * | 9/2002 | Brune | 273/143 R |
| RE37,885 | E | | 10/2002 | Acres et al. | |
| 6,475,088 | B1 | | 11/2002 | Jones et al. | |
| 6,485,368 | B2 | | 11/2002 | Jones et al. | |
| 6,506,118 | B1 | | 1/2003 | Baerlocher et al. | |
| 6,565,434 | B1 | | 5/2003 | Acres | |
| 6,575,830 | B2 | | 6/2003 | Baerlocher et al. | |
| 6,588,747 | B1 | | 7/2003 | Seelig | |
| 6,589,115 | B2 | | 7/2003 | Walker et al. | |
| 6,599,192 | B1 | | 7/2003 | Baerlocher et al. | |
| 6,599,193 | B2 | * | 7/2003 | Baerlocher et al. | 463/27 |
| 6,602,137 | B2 | | 8/2003 | Kaminkow et al. | |
| 6,609,974 | B2 | | 8/2003 | Mead et al. | |
| 6,626,758 | B1 | | 9/2003 | Parham et al. | |
| 6,634,946 | B1 | * | 10/2003 | Bridgeman et al. | 463/28 |
| 6,663,489 | B2 | | 12/2003 | Baerlocher | |
| 6,666,766 | B2 | | 12/2003 | Baerlocher et al. | |
| 6,712,693 | B1 | | 3/2004 | Hettinger | |
| 6,719,632 | B2 | | 4/2004 | Palmer et al. | |
| 6,726,563 | B1 | | 4/2004 | Baerlocher et al. | |
| 6,733,386 | B2 | | 5/2004 | Cuddy et al. | |
| 6,758,749 | B2 | | 7/2004 | Krintzman | |
| 6,758,750 | B2 | | 7/2004 | Baerlocher et al. | |
| 6,761,632 | B2 | | 7/2004 | Bansemer et al. | |
| 6,776,711 | B1 | | 8/2004 | Baerlocher | |
| 6,783,458 | B2 | | 8/2004 | Mead et al. | |
| 6,786,819 | B2 | | 9/2004 | Baerlocher et al. | |
| 6,793,579 | B2 | | 9/2004 | Baerlocher et al. | |
| 6,796,905 | B2 | | 9/2004 | Baerlocher et al. | |
| 6,811,483 | B1 | | 11/2004 | Webb et al. | |
| 6,817,944 | B2 | | 11/2004 | Kaminkow et al. | |
| 6,852,027 | B2 | | 2/2005 | Kaminkow et al. | |
| 6,852,030 | B2 | | 2/2005 | Baerlocher et al. | |
| 6,905,407 | B2 | | 6/2005 | Nordman | |
| 6,960,133 | B1 | | 11/2005 | Marks et al. | |
| 6,966,834 | B1 | | 11/2005 | Johnson | |
| 6,971,955 | B2 | | 12/2005 | Baerlocher et al. | |
| 6,979,263 | B2 | | 12/2005 | Baerlocher et al. | |
| 7,001,273 | B2 | | 2/2006 | Baerlocher | |
| 7,001,278 | B2 | | 2/2006 | Maya et al. | |
| 7,056,210 | B2 | | 6/2006 | Bansemer et al. | |
| 7,169,044 | B2 | | 1/2007 | Baerlocher et al. | |
| 7,172,506 | B2 | | 2/2007 | Baerlocher et al. | |
| 2001/0018361 | A1 | | 8/2001 | Acres | |
| 2003/0003989 | A1 | | 1/2003 | Johnson | |
| 2003/0052452 | A1 | | 3/2003 | Spur et al. | |

* cited by examiner

200

| Average Value | Weight |
|---|---|
| 10% | 75 |
| 25% | 10 |
| 50% | 8 |
| 75% | 7 |
| 100% | 100 |

202 204

*Fig. 2*

TECHNIQUES FOR GENERATING RANDOM AWARDS USING A PLURALITY OF AVERAGE VALUES

CROSS-REFERENCES TO RELATED APPLICATIONS

This application claims priority from U.S. Provisional Application No. 60/636,061, entitled "Random Prize Pool Awarding Method", filed Dec. 15, 2004, and U.S. Provisional Application No. 60/678,132, entitled "Random Pay Gaming Method", filed May 6, 2005, both of which are herein incorporated by reference in its entirety for all purposes.

BACKGROUND OF THE INVENTION

Embodiments of the present invention are related generally to gaming and more specifically to techniques for generating random awards.

Conventional gaming devices have a top award called a jackpot that is limited by the probability of aligning a finite number of jackpot indicia. In order for a gaming device to remain profitable over time, the amount of awards multiplied by the probability of winning the awards is less than the average amount wagered in winning the awards. In order for a gaming device to payout a large predetermined jackpot, for example, $100,000, the odds of winning the jackpot must be extremely low in order for the machine to be profitable over time. Because of this, it normally takes long periods of time between large jackpot payouts. Even though players are still attracted to the opportunity of winning a $100,000 dollars, disadvantageously, because of the low frequency of winners and the extremely low probability of winning, players tend to lose interest in playing and tend to move on to games that have a higher frequency of winning a jackpot.

Conventional progressive gaming systems have been used to produce progressive pools, ranging from thousands to millions of dollars by using a progressive gaming system in conjunction with a gaming device or devices. In most of these systems, a number of gaming devices and/or location are coupled to a central computer system. As wagers are placed in the gaming devices, a portion of each wager is contributed to at least one progressive pool. As contributions are made to the progressive pool, the size of the pool grows until it is awarded to a player. When the player properly aligns a predetermined set of indicia on the gaming device the entire pool is paid. These progressive amounts are displayed on the gaming device and/or showcased on a display above the individual gaming device or a group of gaming devices.

While the above gaming devices and progressive gaming system with its added progressive pool have proved satisfactory in stimulating game play on the coupled gaming devices, disadvantageously, it has been observed that game play tends to decrease immediately after the total progressive pool has been won. Not until the displayed current pool value increases considerably above the initially reset base value does game play increase to its more usual levels. This fall-off in game play is a result of the players on the gaming devices being reluctant to institute game play when the displayed current pool value is close to the initial base value, since the players know that the value will likely increase to a more substantial level. Fall-off in game play at any time is undesirable and detracts from the benefits of the added progressive gaming system.

It should be noted that increased payoffs are being demanded by the market to maintain and increase player appeal. Nevertheless, the probability of win and payout that allows for a reasonable business profit must be assured to casino owners. Generally the profit-hold objectives before taxes and operational costs that are deducted are in a range as low as 2.7% and generally up to 15%. Hence, the higher payoffs for a winning indicia combination is counterbalanced with less probability for the high win combination of indicia.

Disadvantageously, the probability of hitting a large progressive award on a gaming device is extremely low, thus causing long periods of time to pass by, between winners, of the large progressive award pools. Even though players are still attracted to the chance of winning over a million dollars, because of the low frequency of winners and the extremely low probability of winning, players tend to lose interest in playing and tend to move on to games that have higher odds frequency of winning jackpots.

In addition, progressive pools increase as wagers are placed in the gaming devices, a portion of each wager is contributed to at least one progressive pool. As contributions are made to the progressive pool, the size of the pool grows until it is awarded to a player. Because a portion of the wager from each gaming device is the only way to contribute to the progressive pool, when game play (coin-in) decreases the progressive pool increments at a slower rate, causing less excitement and player appeal. Disadvantageously, because of this and fall-off, progressive pools can remain stagnant for long periods of time creating a loss in revenues for the Gambling Establishments.

BRIEF SUMMARY OF THE INVENTION

Embodiments of the present invention are related generally to techniques for generating random awards. A method of providing a game for a gaming device is provided. The method includes providing a plurality of average values. Average values in the plurality of average values represent different values of a prize pool. A wager amount and an input to initiate game play are received. An average value is selected from the plurality of average values and a random award is determined from the prize pool. The random award is determined from the average value selected from the plurality of average values.

In one embodiment, a method of providing a game for a gaming device is provided. The method comprises: providing a plurality of average values, wherein average values in the plurality of average values represent different values of a prize pool; receiving, at the gaming device, a wager amount; receiving an input to initiate game play; selecting an average value from the plurality of average values; and determining a random award from the prize pool, wherein the random award is determined from the average value selected from the plurality of average values.

In another embodiment, a method of providing a game for a gaming device is provided. The method comprises: providing a plurality of average values, wherein average values in the plurality of average values represent different values of a prize pool; determining that a random award should be generated substantially before, during, or substantially after a game being played on the gaming device; when it is determined that the random award should be generated, selecting an average value from the plurality of average values; and determining a random award from the prize pool, wherein the random award is determined from the average value selected from the plurality of average values.

In yet another embodiment, a method of providing a game for a gaming device is provided. The method comprises: providing a plurality of average values, wherein average values in the plurality of average values represent different values of a prize pool; receiving, at the gaming device, a wager amount; receiving an input to initiate game play; determining a first average value, the first average value being predetermined; determining a second average value, the second average value being randomly selected from the plurality of average values; and determining a random award from the prize pool, wherein the random award is determined from first average value and the second average value.

In another embodiment, a gaming device configured with logic to perform the methods described above is provided.

A further understanding of the nature and advantages of the present invention herein may be realized by reference to the remaining portions of the specification and the attached drawings. Reference to the remaining portions of the specification, including the drawing and claims, will realize other features and advantages of the present invention. Further features and advantages of the present invention, as well as the structure and operation of various embodiments of the present invention, are described in detail below with respect to the accompanying drawings. In the drawings, the same reference numbers indicate identical or functionally similar elements.

BRIEF DESCRIPTION OF THE DRAWINGS

FIG. 2 shows a table of a plurality of average values according to one embodiment of the present invention.

DETAILED DESCRIPTION OF THE INVENTION

Embodiments of the present invention generate random awards. A player becomes eligible to win at least one randomly generated weighted monetary and/or non-monetary award (random award) from at least one fixed or progressive (prize pool) before, during, or after game play. For example, the player becomes eligible once a player bets at least one wager amount and initiates game play on any participating gaming device. Also, the player may become eligible using other criteria that is not dependent on the user initiating game play or the user playing a game, such as when a player presents an identity card to a card reader or when a dollar amount is reached in a progressive prize pool. The random award may be generated with or without regard to game outcome.

Embodiments of the present invention provide a plurality of average values. One of the average values is selected for use in determining a random award. The average value may be randomly selected. A random award is then generated based on the selected average value. For example, a function that generates a random award based on a minimum, maximum, and average value may be used. The function may have at least two parameters and may be normalizable over the interval of desired award values. Because multiple average values are provided, the random amounts generated over multiple game plays may vary depending on the average value selected. For example, it may be expected that if a higher average value is selected, a higher random award may be generated than if a lower average value is selected. This, however, may not always be the case because of the randomness of the generation. But, more frequent volatile random awards may be generated on the average by randomly selecting different average values from a weighted distribution.

Figure 1:
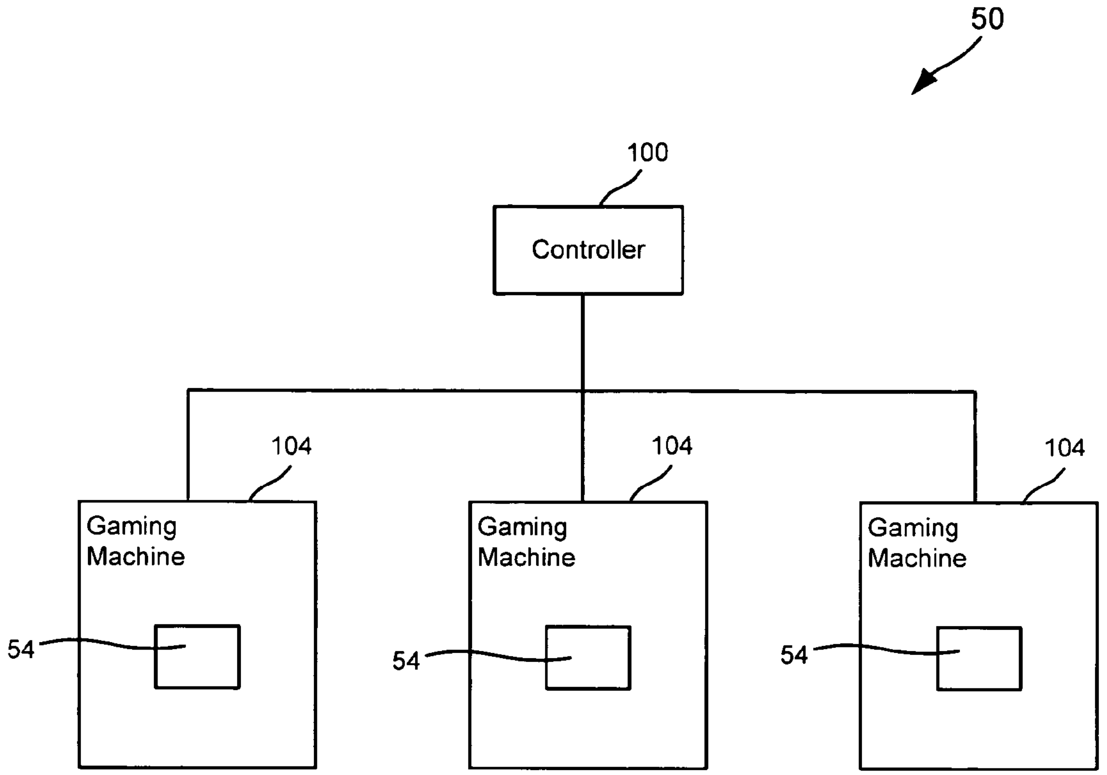
FIG. 1 depicts a simplified system according to one embodiment of the present invention.

FIG. 1 depicts a simplified system 50 according to one embodiment of the present invention. System 50 may be operated by a gaming establishment. For example, a gaming establishment may be a casino, super market, gas station, an on-line gaming company, or any other entity that is involved in gaming.

As shown, a plurality of gaming machines 104 are provided. Gaming machines 104 may be any gaming machines, such as spinning reel slot machines, video poker machines, computing devices running games, clients running games being served by a server, a server serving games, a personal computer, etc. Gaming machines 104 provide games of chance. For example, the games may include poker, video poker, slot reel games, table games, etc. In one embodiment, the games may be games of skill. For example, the games may be any video poker games, such as Deuces Wild, Double Double Bonus, Jacks or Better, etc., and for any pay table used in video poker. These games of skill require player decisions that vary the outcome the games.

A controller 100 may be provided that is configured to communicate with multiple gaming machines 104. Controller 100 may coordinate a networked number of gaming machines 104 to provide a game. For example, each networked gaming machine may be playing for a progressive jackpot.

A random award generator 54 is configured to generate random awards. The random awards are generated based on an average value selected from a plurality of average values and a minimum and maximum value. Although the awards may be random, multiple random awards that are generated over a number of game plays may substantially be equal to the average value used.

Random award generator 54 may be implemented in software, hardware, or any combination thereof. Also, random award generator 54 may be provided in a gaming device 104, in a controller 100, and in both.

FIG. 2 shows a table 200 of a plurality of average values according to one embodiment of the present invention. A column 202 shows a plurality of average values and a column 204 shows a plurality of weightings corresponding to the average values.

Column 202 includes average values of 10% of a prize pool, 25% of a prize pool, etc. Although four average values are shown, it will be understood that any number of average values can be used. Also, the average values can be any value and do not have to be a percentage of a prize pool.

Column 204 shows weightings that can be applied to the average values. The weightings are used to determine how often an average value is randomly selected on the average. Although weightings are described, it will be understood that weightings do not always need to be used. Referring to table 200, the average value of 10% is weighted at 75. This means on the average 75% of the time, the 10% average value may be randomly selected. Similarly, on the average 10% of the time, the 25% average value may be randomly selected.

By selecting different average values to generate random awards from a prize pool, the random awards may be more volatile than generating random awards from only one average value. For example, if a first average value of (e.g. 5% with a weighing of 90%) and a second average value of (e.g. 30% with a weighing of 10%) are randomly selected from a prize pool. When the first average value of 5% is randomly selected on the average the random awards will range around 5% of the prize pool and when a second average value of 90% is randomly selected on the average the random awards will range around 90% of the prize pool. Thus, on the average with the proper weighted distribution and average award values, more volatile random awards may be generated from the prize pool using two average values 5% and 90% then if only the first average value or 5% is used.

An average of the "average" may be used to determine an overall average that random awards would average over multiple random awards. Referring to table 200, the average of the average is: Sum of 0.75*10%+0.10*25%+0.08*50%+0.07*75%=19.25%. Thus, as the average values are randomly selected, the average value paid out over multiple random amounts generated on the average may be 19.25% of the prize pool. However, because of the variations of average values used, the random amounts generated from the prize pool may be more volatile on the average than if the 19.25% is the only average value used.

Figure 3:
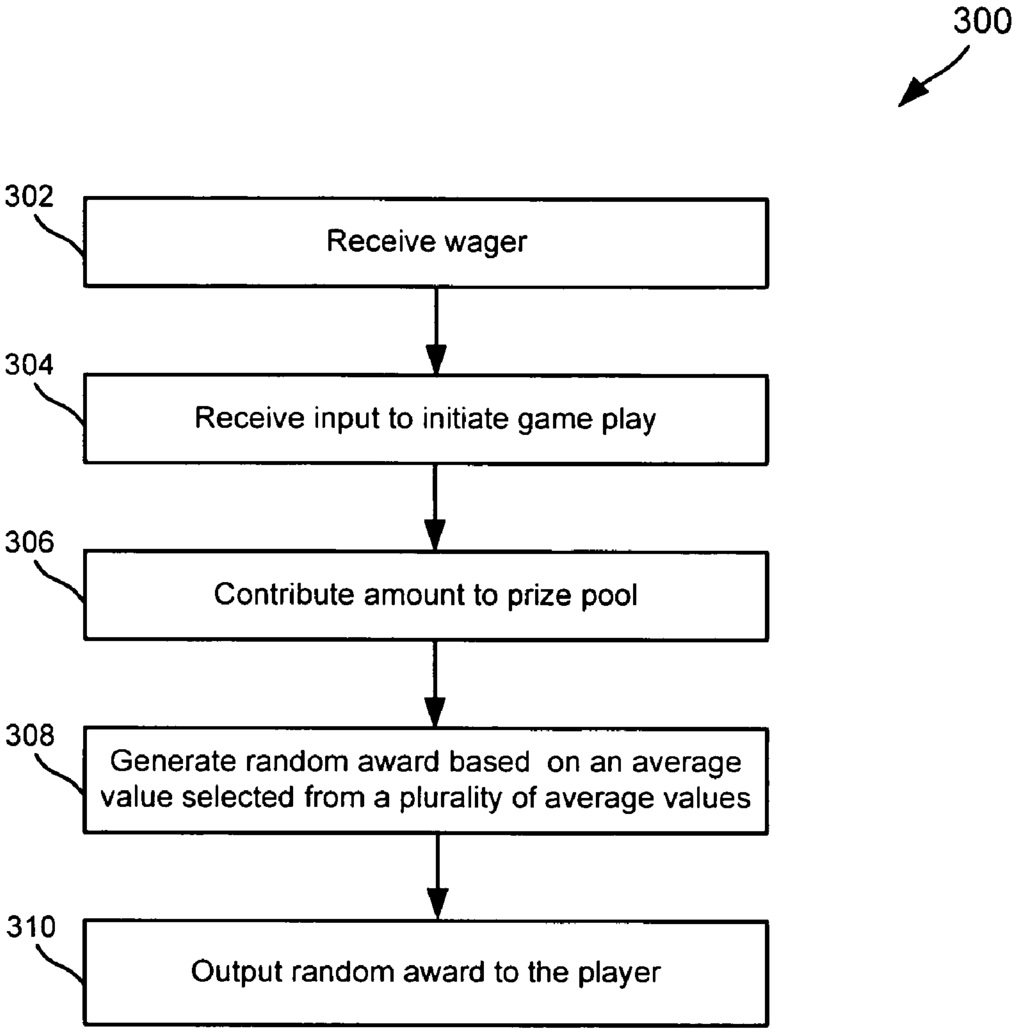
FIG. 3 depicts a simplified flowchart of a method for generating random awards according to one embodiment of the present invention.

FIG. 3 depicts a simplified flowchart 300 of a method for generating random awards according to one embodiment of the present invention. In step 302, a wager is received. For example, a user may insert coins or use credits to start a game on gaming machine 102. The wager may be any amount. For example, a wager may be between 1 to 5 coins in any denominations, such as in nickel, quarter, dollar, and five dollar denominations.

In step 304, an input to initiate game play is received. The initiation of game play then starts an individual game. For example, a user may press a deal/draw button on gaming machine 102. Also, the initiation may be automatic, such as when a max bet has been inputted.

In step 306, an amount is contributed to the prize pool. For example, a percentage of the wager and/or a percentage of non-gaming revenues, such as point of sales, promotional allowances, etc, may be contributed to the prize pool. Non-gaming revenues may be anything that is not considered coin-in to the game being played on the gaming machine (e.g., the player's wager). For example, marketing expenses may be considered non-gaming revenue. Also, even if a gaming establishment's budget is funded by gaming revenues generated from the gaming establishment's winnings received from the gaming device, this budget may be considered non-gaming revenue.

In step 308, before, during, or after game play, a random award is generated based on an average value selected from a plurality of average values. The random award may be dependent upon game outcome and/or not dependent upon game outcome. For example, the generation of the random award may be triggered after a certain number of game plays (random or not random number of game plays), by time, when a predetermined threshold has been reached, when a randomly selected threshold amount from at least two threshold amount has been reached, every time one or more predetermined monetary amounts of contribution from one or more gaming devices has been contributed to the prize pool, in response to a wager received (e.g., the player inputs a bonus wager, max bet, any wager, etc), when a certain game outcome occurs (e.g., a four of a kind, etc.), etc. The random award generated may depend on the wager bet. For example, more coins bet may generate larger random awards (e.g., inputting five coins instead of one coin in a video poker game).

Although the random award is described as being generated in response to receiving a wager and initiating game play, the random award may be generated based on other criteria such as a trigger event. For example, when the prize pool reaches a threshold amount, a random award may be generated.

In step 310, the random award is outputted to the player. For example, the random award may be displayed for the player to see. The random award may be outputted before, during, or after game play.

In one embodiment, the random award may be awarded in addition to any awards for game play of the game. For example, the random award is awarded no matter what happens for game play. Also, random awards may be generated for possible game outcomes and are awarded if a game outcome occurs for game play. For example, if a four of a kind is received, the player is awarded a random award for the four of a kind outcome.

Figure 4:
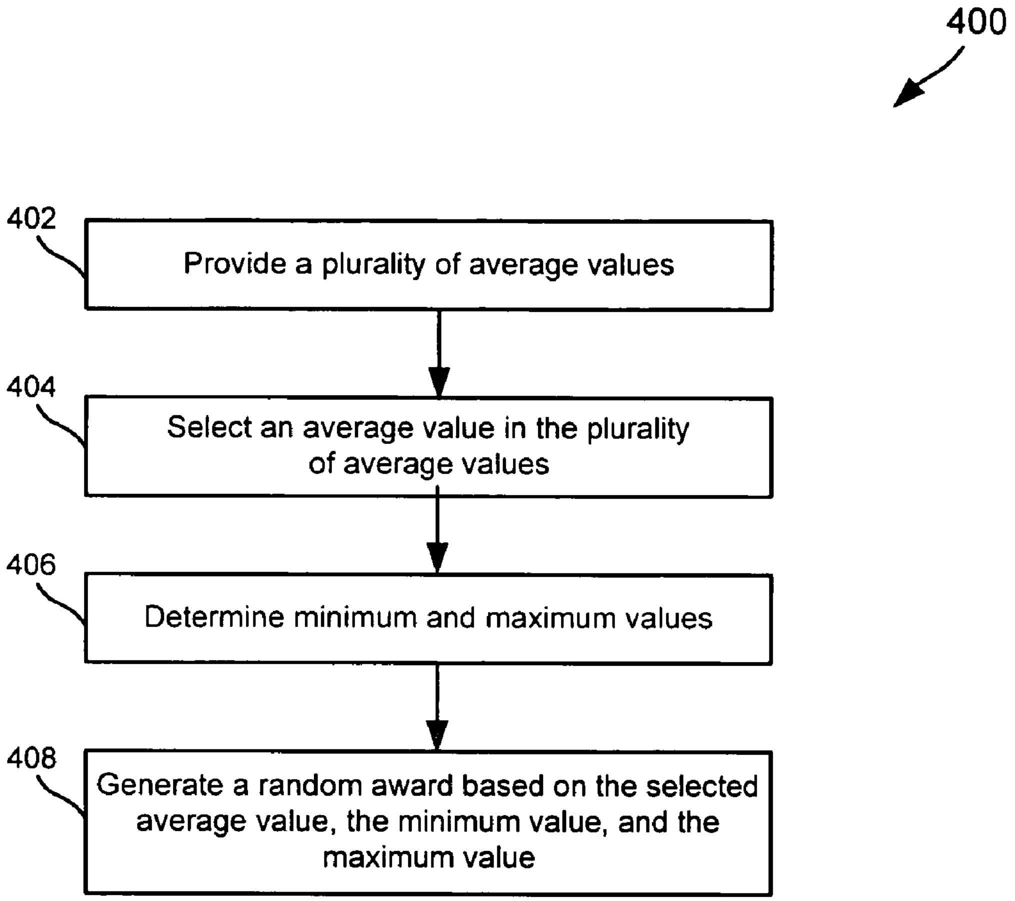
FIG. 4 depicts a simplified flowchart of a method for generating a random award according to one embodiment of the present invention.

FIG. 4 depicts a simplified flowchart 400 of a method for generating a random award according to one embodiment of the present invention. In step 402, a plurality of average values are provided. These average values may be different percentages of the prize pool. In other embodiments, the average values may be preset values, such are dollar amounts.

In step 404, an average value in the plurality of average values is selected. Although one average value is described as being selected, it will be understood that any number of average values may be used. In one embodiment, the average value may be randomly selected. The random selection may be based on a weighted distribution of the plurality of average values. For example, a random number may be selected and used in a weighted function. The weighted function outputs one of the average values. The weightings indicate how much an average value may be selected over time in relation to the other average values. For example, an average value with a weight of 75 may be randomly selected substantially 75 out of 100 times on the average.

In step 406, a minimum value and a maximum value are determined. The minimum value indicates the minimum award that can be awarded. The maximum value indicates the maximum award that can be awarded. It will be understood that any number of minimum and maximum values may be selected.

In step 408, a function is used for generating random awards based on the selected average value, the minimum value, and the maximum value. For example, a function may include at least two parameters and is normalized over an interval of desired award values. In one example, an exponential weighted function, $A \exp(-B J)$, where A and B are parameters and J is the random award value, is provided. A minimum value of a desired award, a maximum value of the desired award, and an average value is specified and stored. Using these values, the parameters of the weighted function can be calculated, i.e., the values of A and B in the above function.

Now that the weighted function is determined, a weighted random award value is determined between the minimum and maximum values specified, and whose value over time will result in an average value that agrees with the randomly selected average value. In this embodiment, these random award values may be chosen by picking a random number between the function value using the minimum value and the function value using the maximum value. This random value is set equal to the function and the random award is found by solving this equation for J and then by inverting this to find J. Although the above function is described, one of ordinary skill in the art will understand that other functions consistent with the scope and spirit of the present invention may be used.

In another embodiment once a player bets the proper wager amount and initiates game play. The player becomes eligible to win a first random award for a predetermined game outcome e.g. Royal Flush and the player is eligible to win a second random award that may be randomly generated from a plurality of average values that may be randomly selected from a weighted distribution for the same game outcome. For example, for a first random award (e.g. Royal Flush) that has a fixed probability of occurring, the average value of the award can be calculated. As the sum of the products of average value multiplied by the probability which is multiplied by an allocation factor must equal the funding value, and for the second random award (e.g. 50% of the prize pool), whose probability is not fixed but whose average value may be randomly selected from a weighted distribution, then as above, the probability can be calculated. These awards can be combined as long as the sum of these products—allocation*prob*value—equals the funding value. Using the function described that uses a minimum value, a maximum value and an average value to specify the mathematical distribution, the average values of the random awards determined for the first and second random awards are used to distribute the funding value.

When the player receives the predetermined game outcome e.g. Royal Flush, the player is awarded the random award associated with that game outcome. When the player receives the predetermined game outcome e.g. Royal Flush and a second random award is generated for that game outcome also, the first and second random awards may be combined and are awarded to the player.

Funding of the Prize Pool

Embodiments of the present invention provide many ways of funding the prize pool. For example, a percentage of a wager and/or non-gaming revenue (i.e., money or non-monetary items that are not a percentage of the wager for the game) may be used to fund the prize pool. If the gaming device is networked to a new or pre-existing infrastructure of network such as a gaming system, a percentage of each gaming wager from at least one gaming device and/or a percentage of non-gaming revenues e.g., point of sales, promotional allowances, etc. may be contributed to the total progressive pool amount.

If the prize pool is funded by contributing a percentage of non-gaming revenues, the rate of contribution may be determined through a variety of ways. The rate of contribution to the prize pool may be based on time. For example, for every two seconds, $1 is contributed to the prize pool.

Also, the rate of contribution to the prize pool may be based on the amount of gaming and/or non-gaming activity. For example, every time $100 of gaming and/or non-gaming activity occurs in the casino, $3 is contributed to the prize pool.

The rate of contribution to the prize pool may be based on the value of the random award. For example, a random award value of $100 means a contribution of $100 to the prize pool.

The rate of contribution to the prize pool may be based on time zones in a day, month, or year. For example, on a daily basis the rate of contribution could be divided into these zones: from 12 am to 6 am, the rate of contribution may be $1 every ten seconds; from 6 am to 12 pm, the rate of contribution may be $1 every five seconds; and from 12 pm to 12 am, the rate of contribution may be $1 every two seconds.

The rate of contribution to the prize pool may be based on a predetermined percentage of promotional allowances from a gaming establishment's department that equals the total contributions to the prize pool. For example, for every $1.00 contributed to the prize pool, contributions substantially equal to 20% Hotel, 20% Entertainment, 20% Food and Beverage, and 60% Gaming from there individual promotional allowances are used.

Funding a prize pool through non-gaming revenues provides many benefits. For example, it allows a gaming establishment to determine the exact amount of money contributed to the prize pool, determine the rate of contrition to the prize pool during different times of the day, determine the rate of contrition to the prize pool from individual gaming and/or non-gaming activities, increase or decrease the amount of money contributed the prize pool at any time, determine the number of random awards to be rewarded per day, and allow the prize pool to be funded even when gaming devices are not being played. Accordingly, funding a prize pool through non-gaming revenue provides gaming establishments with multiple options for controlling the progressive prize pool that are not provided by funding a progressive prize pool through contributing a percentage of coin-in from the gaming devices.

In one embodiment, if the prize pool is progressive, embodiments of the present invention randomly generate at least one random award from a progressive prize pool, so that the average progressive awards are less than the average progressive contributions to the progressive prize pool in order for the progressive prize pool to increase to a larger size before the entire progressive prize pool is won.

If the player wins a random award, the amount of the random award won may or may not be deducted from the amount showing on the progressive prize pool display. If the amount won is deducted from the progressive prize pool, the amount not won from the progressive prize pool remains displayed and the amount not won is carried over for the next opportunity to win an award from the progressive prize pool. The progressive prize pool is reset to a predetermined monetary base value only after a player wins 100% of the prize pool.

If gaming devices with different pay tables and/or denominations are playing for the same prize pool awards, a hit frequency and wager information may be stored from each gaming device coupled to the networked gaming system so that the award algorithm will display amounts that average properly for each machine.

It will be understood that other methods for funding a prize pool may be used within the scope of the invention and are not limited to the examples described above.

Variations on What is Awarded for the Random Award

The random award may be awarded using monetary and/or non-monetary awards. In one embodiment, once a player bets the proper wager amount and initiates game play, the player becomes eligible to win at least one monetary or non-monetary award (random award) from a prize pool. The random award is randomly generated from an average value selected from a plurality of average values and/or at least one minimum and maximum value. In this implementation, monetary values, a range of monetary values and frequencies (predetermined parameters) may be used to convert the monetary value of the at least one random award into casino points or prizes.

For example, the following conversions may be used as shown in Table 1:

TABLE 1

| Prize | Frequency |
| --- | --- |
| 5 casino points = 1 Cash Dollar | 1 out of every 10 generated random awards not within a cash value range is converted into casino points. |

TABLE 1-continued

| Prize | Frequency |
|---|---|
| Sony DVD Player—Cash value range $300 to $500 | 1 out of every 20 generated random awards in the cash value range of $300 to $500 is converted into this prize. |
| America Airlines round trip ticket to anywhere in the world—Cash value range $1,000 to $1,300 is converted into prize two | 1 out of every 15 generated random awards in the cash value range of $1,000 to $1,300 is converted into this prize. |
| Pioneer Plasma Screen TV—Cash value range $5,000 to $7,000 | 1 out of every 3 generated random awards in the cash value range of $5,000 to $7,000 is converted into this prize. |
| Harley Davison Motorcycle—Cash value range $16,000 to $18,000 | 1 out of every 5 generated random awards in the cash value range of $16,000 to $18,000 is converted into this prize. |

In one example, a total progressive prize pool amount is $10,000. When a predetermined amount (e.g., $200) is contributed to the prize pool, a prize pool game is triggered. Once a prize pool game is triggered an eligible player is randomly selected for a random award. Once a player has been selected, the gaming device (or controller) generates at least one random award. The random award is randomly generated from a randomly selected average value from a plurality of average values from a weighted distribution (e.g., 2 average values may be provided: $100 is the first average value with a weighing of 70% and 30% of the prize pool is the second average value with a weighing of 30% are randomly selected from the prize pool). A minimum value may be $50 and a maximum value may be the current progressive prize pool value e.g., $10,000. The gaming device generates ten random awards from the prize pool and determines which random awards will be cash, casino points, or prizes. For example, the random awards may be a Sony DVD Player, $179, $545, $3,269, $115, $296, 625 casino points, $138, $103, and $189 based on the predetermined parameters described above. After the gaming device generates ten random awards and has determined which random awards will be cash, casino points, or prizes, the random award may be displayed to the player and the gaming device randomly selects one of the random awards (e.g., $545). After the gaming device selects a random award, the player is awarded the random award and the monetary value of the random award is deducted from the progressive prize pool.

More Detailed Embodiment of a Gaming System

Figure 5:
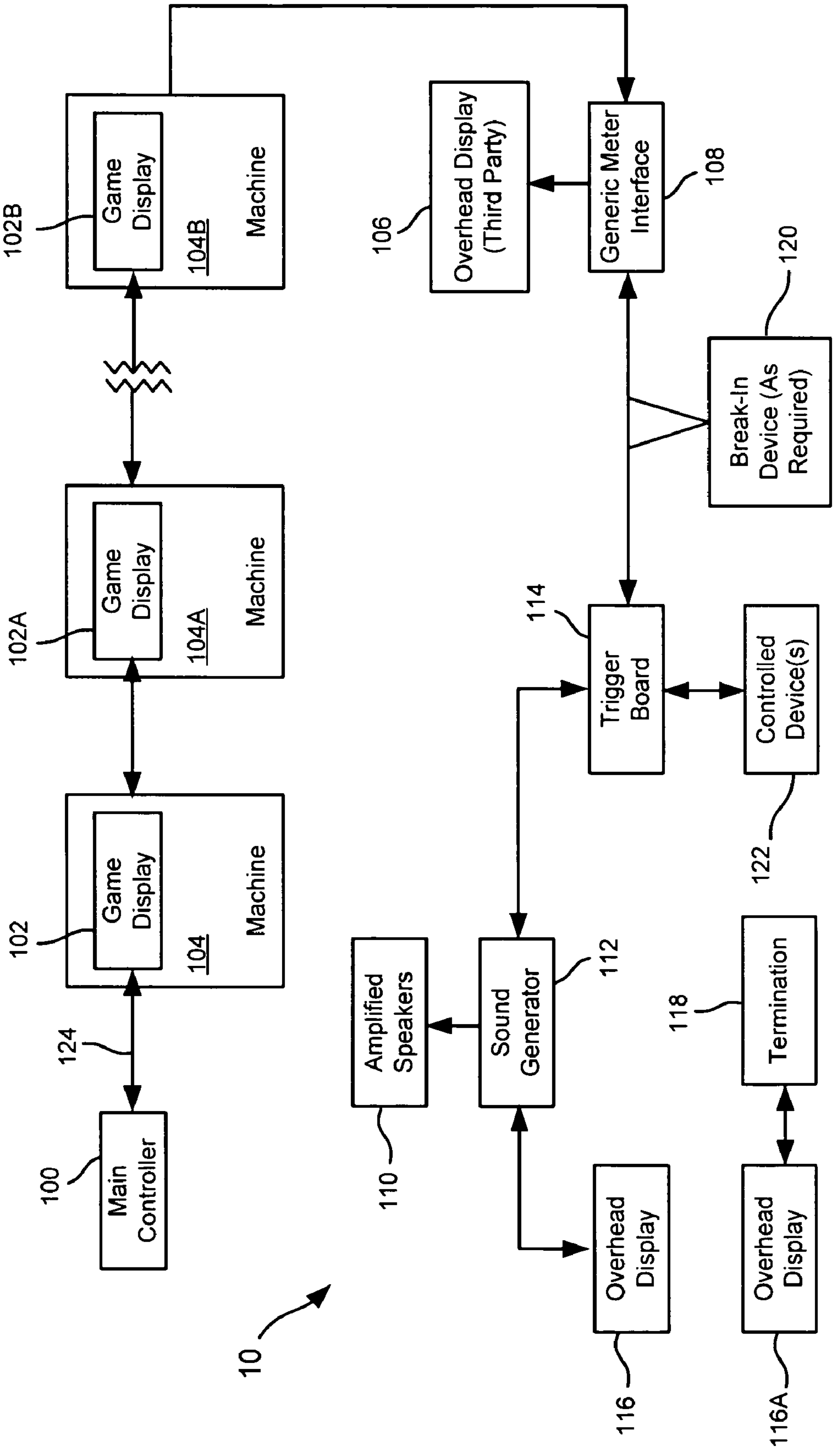
FIG. 5 is a block diagram of a gaming system for awarding payouts and prizes according to one embodiment of the present invention.

FIG. 5 is a block diagram of a gaming system 10 for awarding payouts and prizes according to one embodiment of the present invention. Among other components, gaming system 10 comprises at least one programmable controller 100; one or more gaming devices 104, 104A, 104B; one or more programmable Machine Interface Boards 102, 102A, 102B; one or more overhead displays 116, 116A or an existing display 106 with a generic display interface 108; an optional sound units 112; one or more trigger board units 114; and one or more "break in" devices 120 for system programming on the casino floor. Gaming system 10 may be used for implementing embodiments of the present invention.

In an alternate embodiment, embodiments of the present invention are implemented on one or more electronic or computer-controlled processor controlled, etc gaming devices. One or more gaming devices 104, 104A are coupled to a programmable controller 100 over a communication network 124, which could be any suitable serial or parallel bus arrangement. Indeed, any communication link 124 may be used and at least one programmable (controller) 100 may be located remotely from or within the gaming devices 104, 104A. At each gaming device 104 may be a programmable machine interface board 102 that interfaces between the conventional electronic circuitry of gaming device 104 and the communication network 124.

In this embodiment, any new or used conventional electronic or computer-controlled processor controlled, etc gaming devices e.g. video games, spinning reel slot games, keno games, live card games with tables interfacing with electronic equipment, internet and/or networked games, computing devices running games, clients running games being served by a server, a server serving games, etc. may be used. Furthermore, the controller 100 can be any suitable computer-based controller.

The at least one controller 100 used can be any of a number of different controllers and computer based processing systems. How controller 100 communicates with each gaming machine 104 over the communication network 124 is a matter of design choice and the protocols of communication are determined by the nature of the communication network 124 and the corresponding interface circuits.

The at least one controller 100 may optionally be connected over communication link 124 to another computer system, not shown. Furthermore, the network 124 in some embodiments is a telecommunications network such as a phone link, intranet, Internet, satellite, etc. In these embodiments, the gaming devices are implemented as game software in personal computers which are located in remote locations such as hotel/motel rooms, homes, etc.

Embodiments of the present invention use a random number generator located in a machine interface board 102, controller 100 or in the gaming device 104 to randomly generate at least one random award as a function of a random number from a fixed or progressed prize pool with or without regard to game outcome.

As noted, among other components, a gaming device 104, at least one controller 100, and a display for displaying a fixed or progressed distinct monetary prize pool amount on gaming device 104 and/or on the video screen (not shown) of gaming device 104 and/or showcased on a display 116 or 106 above the individual gaming device 104 or a group of gaming devices 104 is provided. Additional devices may be connected to generate sounds and indicators of win to stimulate play.

Any devices or any combination of any devices to display the random award and/or the entire amount of a monetary prize pool can be used, such as a game display (e.g., video screen) 102 of gaming device 104, overhead display 116, plasma screen, etc. For example, the random award that the player is eligible to win can be displayed on the gaming device's monitor screen or in-game meter prior to winning the random award. Also, the random award can be displayed as indicia and not be displayed until after the player selects the proper winning indicia. In another embodiment, the random award that the player is eligible to win may not be displayed to the player until after the player has achieved a winning game outcome or completed certain bonus mode criteria.

Once a player bets the proper wager and initiates game play on any participating gaming device, the player becomes eligible to win one or more randomly generated weighted monetary and/or non-monetary award (random award) from the prize pool. However, any eligibility requirements or any combination of any eligibility requirements can be used, such as rate of play, max wager, insertion of player cards, one or more predetermined indicia, buy a pay, separate wager bet, etc.

In one embodiment in order to ensure player awareness, a predetermined amount minimum and maximum for at least one predetermined winning indicia for that gaming device is displayed. An award table and/or display on gaming device 104 always shows a predetermined minimum and maximum amount for the player. Once the player bets the proper wager a random award is displayed on a separate display or added to the display showing the minimum amount on the gaming device. The predetermined minimum amount is the amount of the gaming devices predetermined payout for the selected predetermined winning set of indicia, but a player also has the opportunity to win a random award up to the maximum award that is a randomly generated award from the prize pool based on an average value in the plurality of average values.

If the player wins a random award, the payout, can be "paid out" by any payout methods that will be appreciated by those skilled in the art, such as by gaming device 104 through a currency chute, ticket printer or by increasing the amount of winnings shown in a credit window (not shown) of a gaming device and/or a hand pay by an attendant, etc.

Various Games that may be Provided Using Embodiments of the Present Invention

Embodiments of the present invention may be used to provide many different games. For example, a plurality of average values may be provided. When the average value is selected, the selected average value may be used to generate random awards for a variety of games, such as a bonus game, an at least two outcome game, secondary event bonus game, secondary prize pool game, and a multi-player prize pool game.

Bonus Game

In one embodiment, a bonus game is provided in addition to a primary game. For discussion purposes, the total progressive prize pool amount is at $10,000. Once a player bets the proper wager amount and initiates game play on a gaming device connected to a gaming system, the player (i.e., gaming device) becomes eligible to win a random award from a progressive pool in a bonus game. Once the prize pool reaches a predetermined or randomly selected amount (e.g., a top Progressive Award $20,000), the next eligible player wins the top total progressive amount displayed. The random award is randomly generated from an average value randomly selected from a plurality of average values. For example, two average values may be used, a first average value of $100 and a second average value of 30% of the prize pool. The second average value may be that it is randomly selected 1 out of every 30 times on the average. A minimum value (e.g., $50) and maximum value equal to the current progressive prize pool value e.g., $10,000 may also be used. Every time game play is initiated on an eligible gaming device, a random award is generated from the progressive pool and it is displayed by the gaming device. When a predetermined amount of contribution (e.g. $200) from one or more gaming devices connected to the gaming system is contributed to the progressive pool, a bonus game is triggered. (Multiple bonus games can be triggered simultaneously. For example, if a second bonus game is triggered before a first bonus game is completed, the second bonus game is queued until the first bonus game is completed. Once the first bonus game is completed, the second bonus game may begin. The process repeats until all bonus games are completed). Once a bonus game is triggered, one of the eligible gaming devices is selected for a random award from the progressive prize pool. The player playing the eligible gaming device selected is then awarded the random award being displayed. The amount awarded to the player may be subtracted from the progressive pool and game play resumes as normal.

Generating Random Awards for At Least Two Game Outcomes

In another embodiment, a game, such as a standard five coin max bet Jacks or Better poker game with a 5/8 pay table, is programmed to allow a player to bet a proper wager amount and initiate game play. The player becomes eligible to win a first random award for each of at least two predetermined game outcome, e.g., Royal Flush and Straight Flush, and Four of a Kind. The player is eligible to win a second random award generated from a one of a plurality of average values randomly selected from a weighted distribution for the same game outcome from a prize pool.

For example, with multiple random awards (e.g. Royal Flush, Straight Flush, and Four of a Kind) that have fixed probabilities of occurring, the average value of each award can be calculated. The sum of the products of average value multiplied by the probability that is multiplied by an allocation factor equals the funding value. For the second random award (e.g. 50% of the prize pool), whose probability is not fixed but whose average value may be randomly selected from a weighted distribution, then as above, the probability can be calculated. These awards can be combined as long as the sum of these products—allocation*prob*value—equals the funding value. Once the probabilities for each of the 3 winning poker hands and the second random award are known, the only constraint is that the sum of the product of the average value of the random awards times the probabilities is equal to the number of extra coins that will be given away. Using the function described above that uses a minimum value, a maximum value, and an average value to specify the mathematical distribution, the average values of the random awards determined for the multiple random award and second random award are used to distribute the funding value.

If only a fraction of these extra coins are to be given away than this sum equals the extra coins times the specified fraction. For each winning poker hands and the second random award, this sum equals the extra coins. (However, the fraction of the expected value that each hand contributes can be arbitrarily specified within the limits that the sum of the allocation equal the extra coins. For example, Royal Flush=25%, Straight Flush=25% and second random award=55%=100% extra coins). Any other allocation can be used as long as the sum equals the extra coins. For example, a player may have a selectable option that allows the player to select at least one of the 2 different winning poker hands, such as the Royal Flush poker hand, to be eligible to win a random award for the winning combinations selected. If the player selects 1 winning poker hand (e.g., Royal Flush) to be eligible for the random awards, then each average award times its probability equals ½ of the extra coins. When the player receives the selected predetermined game outcome (e.g. the Royal Flush), the player is awarded the random award associated with that game outcome. When the player receives the selected predetermined game outcome (e.g., Royal Flush) and a second random award is generated for that game outcome also, the first and second random awards may be combined and are awarded to the player.

Secondary Event Bonus Game

In one embodiment, once a player bets at least one proper wager amount and initiates game play on a gaming device, the player becomes eligible to win at least one random award out of at least two random awards from at least one prize pool in a secondary event bonus game (SEBG). The random award is randomly generated from an average value selected from a plurality of average values. For example, two average values may be used, a first average value of $50 and a second average value of $150 may be used. The gaming device is played and upon the occurrence of a random and/or predetermined event, the player is provided with an opportunity to play in a SEBG. In one example, the player has a chance to win 1 random award out of 6 random awards. In the SEBG, 6 segments (e.g. positions, places, sections, indicia, etc) are displayed to player. One of the unique features is that the player is given the opportunity select which one of the 6 segments in the SEBG will be the winning segments for a random award. After the player selects a segment (e.g., the player selects segment 5) in the SEBG, a random award based on a larger average value (i.e. $150, the second average value) is generated for that segment and random awards based on a lesser average value (e.g., $50, the first average value) is used for each of the other segments. The random awards maybe #1=$30, #2=$15, #3=$150, #4=$245, #5=$350, and #6=$85. On the average, the random award for the segment selected by the player (e.g., #5=$350) will receive a larger random award because it was generated with a larger average value (, e.g., $150, the second average value). Once a random award has been generated for each of the segments, the player initiates the SEBG and one of the segments is randomly selected (e.g. 4=$245) and awarded to the player.

Secondary Prize Pool Game

In one embodiment, once a player bets at least one proper wager amount and initiates games play on a gaming device, the player becomes eligible to win at least one random award for a predetermined game outcome from a prize pool in a progressive (prize pool game. The random award is randomly generated from an average value selected from a plurality of average values. For example, a first average value is equal to 95% of the players wager and a second average value is equal to 20% of the prize pool and a third average value is equal to 100%. An average value is randomly selected from a weighted distribution. When the player receives at least one game outcome in a primary game the player is provided with two options. The player either can choose to continue playing the primary game or can choose to play the prize game and win a random award. Every time the player is provided with the options either to continue playing the primary game or to play the prize pool game, the range in which the player can win a random award from the prize pool may be displayed.

If the player chooses to play the prize pool game, the player may be required to wager a portion of the game outcome credits received in the primary game. (As an option the player may be able to increase the credits wagered in the prize pool game). If the player chooses to play the prize pool game, at least two indicia are displayed to the player. Associated with the at least two indicia is a random award that is randomly generated from the prize pool.

The object of the prize pool game is for the player to select the indicia with the largest random award associated with it. In the prize pool game the player selects one of the at least two indicia and wins the random award associated with the indicia. After the player selects one of the indicia the random awards associated with remaining indicia may be displayed. (As an option the player can play the progressive game again). If the player chooses not to play the progressive game again, the player is awarded the random award. In this embodiment, the progressive prize pool is only reduced from random awards won that were based on the second and third average values.

While the above is a complete description of exemplary specific embodiments of the invention, additional embodiments are also possible. For example, the RPGM may relate to any novel or conventional electronic or computer-controlled gaming devices e.g. video games, spinning reel slot games, keno games, etc that offer a primary game payout and a may offer a secondary prize pool payout that can be used in conjunction with a new or pre-existing infrastructure of network such as a gaming system, rewards system, credit card system, consumer rewards or incentive systems, player tracking system, loyalty program systems, etc and may be used for a promotional device, state lottery or non-gaming environment for prize give a ways.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method of providing random awards for a game for a gaming device, the method comprising:

providing a plurality of average values, wherein average values in the plurality of average values represent different values of a prize pool, wherein average values in the plurality of average values are selectable for an event that results during playing of the game;

selecting for the event over multiple game plays, whereby volatility is introduced into award determination, at least a first average value representing a first value of the prize pool and a second average value representing a second value of the prize pool, whereby the first and second average values are different;

generating the random awards using the first average value or the second average value, wherein the random awards vary in value over multiple game plays when generated for the event, wherein a first distribution of values for random awards generated using the first average value is different from a second distribution of values for random awards generated using the second average value, to increase volatility in distribution of the values of the random awards generated for the event over multiple game plays; and awarding, using the gaming device, at least one of the generated random awards over multiple game plays when the event occurs.

2. The method of claim 1 wherein the prize pool is progressive.

3. The method of claim 1, wherein the first value of the prize pool and the second value of the prize pool represent different percentages of the prize pool.

4. The method of claim 1, wherein the first and second average value are randomly selected from the plurality of average values.

5. The method of claim 1, further comprising determining a minimum value and a maximum value, wherein generating the random awards from the prize pool comprises using a function that uses the minimum value, average value, and maximum value to determine the generated random awards.

6. The method of claim 1, wherein the selecting and generating are performed in response to receiving a wager amount and an input to initiate game play of the game.

7. The method of claim 1, further comprising:
performing game play to determine a game outcome; and
determining a game award in addition to the random awards, wherein the game award is determined based on the game outcome.

8. The method of claim 1, wherein the random awards are generated without regard to game outcome.

9. The method of claim 1, wherein the random awards are determined before, during or after game play of the game.

10. The method of claim 1, wherein generating the random awards comprises using a function of a random number such that an average of the random awards awarded over of the multiple game plays is equal to an average of weighted averages of the plurality of average values.

11. The method of claim 1, further comprising allocating a portion of the wager amount to the prize pool.

12. The method of claim 1, further comprising allocating a portion of non-gaming revenues to the prize pool.

13. The method of claim 1, further comprising converting at least one of the random awards into a non-monetary award.

14. The method of claim 13, wherein the conversion is performed after the at least one the random awards is determined.

15. The method of claim 1, wherein the random awards are a percentage of the prize pool.

16. A method of providing random awards for a game for a gaming device, the method comprising:
providing a plurality of average values, wherein average values in the plurality of average values represent different values of a prize pool, wherein average values in the plurality of average values are selectable for an event that results during playing of the game;
determining that random awards should be generated substantially before, during, or substantially after multiple game plays being played on the gaming device;
when it is determined that the random awards should be generated, selecting for the event over multiple game plays, whereby volatility is introduced into award determination, at least a first average value representing a first value of the prize pool and a second average value representing a second value of the prize pool, whereby the first and second average value different; and
generating the random awards using the first average vale or the second average value, whereby the random awards vary in value over multiple game plays when generated for the event, wherein the first distribution of the value for random awards generated using the first average value is different from a second distribution of values for random awards generated using the second average value, to increase volatility in distribution of the values of the random awards generated for the event over multiple game play; and
awarding, using the gaming device, at least one of the generated random awards over multiple game play when the events occurs.

17. The method of claim 16, wherein determining that the random awards should be generated comprises making the determination after an input to initiate game play and a wager amount are received.

18. The method of claim 16, wherein determining that the random awards should be generated comprises making the determination after a trigger event.

19. The method of claim 16, further comprising converting at least one of the random awards into a non-monetary value.

20. The method of claim 19, wherein the conversion is performed after the at least one of the random awards is determined.

21. The method of claim 16, wherein the first and second average values are randomly selected from the plurality of average values.

22. The method of claim 16, wherein the prize pool is progressive.

23. The method of claim 16, wherein the first and second average values represent percentages of the prize pool.

24. The method of claim 16, further comprising determining a minimum value and a maximum value, wherein generating the random awards from the prize pool comprises using the minimum value, average value, and maximum value to determine the random awards.

25. The method of claim 16, wherein generating the random awards comprises using a function of a random number such that an average of the random awards awarded over a number of plays is equal to an average of weighted averages of the plurality of average values.

26. A method of providing random awards for a game using a gaming device, the method comprising:
providing a plurality of average values, wherein average values in the plurality of average values represent different values of a prize pool, wherein average values in the plurality of average values are selectable for an event that results during playing of the game;
selecting for the event over the multiple game plays, whereby volatility is introduced into award determination, at least a first average value representing a predetermined value of thee prize pool and a second average value representing a second value of the prize pool, whereby the first and second average values are different; and
generating the random awards using the first average value of the second average value, wherein the random awards vary in value over multiple game plays when generated for the event, wherein a first distribution of values for random awards generated using the first average value is different from a second distribution of values for random awards generated using the second average value to increase volatility in distribution of values for random awards generated for the event over multiple game plays; and
awarding, using the gaming device, at least one of the generated random awards over multiple game plays when the event occurs.

27. The method of claim 1, wherein farther comprising displaying, using the gaming device, the at least one of the generated random awards.

28. The method of claim 16, further comprising displaying, using the gaming device, the at least one of the generated random awards.

* * * * *